United States Patent [19]

Tanikoshi

[11] 4,051,420
[45] Sept. 27, 1977

[54] HALL MOTOR CONTROL SYSTEM

[75] Inventor: Kinji Tanikoshi, Kawasaki, Japan

[73] Assignees: Canon Kabushiki Kaisha; Canon Seiki Kabushiki Kaisha, both of Tokyo, Japan

[21] Appl. No.: 664,385

[22] Filed: Mar. 5, 1976

[30] Foreign Application Priority Data

Mar. 10, 1975 Japan .................................. 50-28821
Apr. 11, 1975 Japan .................................. 50-43943

[51] Int. Cl.² ......................................... H02K 29/00
[52] U.S. Cl. .................................... 318/254; 318/138; 318/439
[58] Field of Search ............... 318/254, 138, 439, 171, 318/696

[56] References Cited

U.S. PATENT DOCUMENTS 3,839,661 10/1974 Wada ................................. 318/138
3,898,544 8/1975 Tanikoshi ......................... 318/254
3,916,272 10/1975 Grunleitner ..................... 318/254

Primary Examiner—Herman Hohauser
Attorney, Agent, or Firm—Fitzpatrick, Cella, Harper & Scinto

[57] ABSTRACT

This specification discloses a Hall motor control system in which Hall elements detect the position of a rotor comprising a permanent magnet to switch over driving currents flowing to driving coils. Induced voltages produced in the driving coils or the voltage detecting coils by rotation of the motor are synthesized by a diode, and the resultant voltage is level-shifted by a level shift circuit including a transistor, and then compared with a reference speed voltage. To control the input to the Hall elements by the comparison output and provide a constant speed of rotation, there are provided temperature compensating means formed by diodes in the base circuit of the transistor of the level shift circuit and in the reference speed voltage circuit, respectively.

12 Claims, 9 Drawing Figures

HALL MOTOR CONTROL SYSTEM

BACKGROUND OF THE INVENTION

1. Field of the Invention

This invention relates to a Hall motor control system in which Hall elements detect the position of a rotor comprising a permanent magnet to switch over driving currents flowing to driving coils.

2. Description of the Prior Art

In the conventional Hall motor control system wherein Hall elements detect the position of a rotor comprising a permanent magnet to switch over driving currents flowing to driving coils, a voltage corresponding to the rotational speed of the rotor or of the motor has been induced in the driving coils and such voltage has been detected by a comparing circuit comprising a switching transistor circuit, whereby when the induced voltage exceeds a predetermined level, the switching transistor circuit is reversed to control the input current to the Hall elements and thus the driving current flowing to the driving coils, thereby imparting a predetermined torque to the motor and controlling the motor to be driven at a predetermined speed at all times.

In the conventional motor control system of this type, however, the voltages proportional to the number of revolutions induced in the coils to which no driving current is then flowing are separated, detected and synthesized by a diode for use as a control voltage, and this has required the use of an element having diode characteristics. In such manner, where the voltage is rectified by the diodes, and the induced voltage is developed, the forward voltage drop $V_F$ in the diode is included as an error in the rotational speed voltage. Such error creating tendency is greater as the number of revolutions is lower and as a result, the ratio thereof to the forward voltage drop in the diode becomes smaller to impair the linearity. Also, the diode is susceptible to temperature variation and therefore, even if compensation therefor is imparted for a certain number of revolutions, the compensation curve will be seriously departed from ideal curve as the number of revolutions is varied and thus, it has been extremely difficult to provide a drive with good temperature characteristic.

Further, in the conventional Hall motor control system of the described type, the detection of the number of revolutions of the motor by the comparing circuit has been done by applying the induced voltage between the base and emitter of the switching transistor to compare the base-emitter voltage $V_{BE}$ of the switching transistor with the voltage corresponding to the reference rotational speed of the motor, but the induced voltage is produced in superposed relationship with the source voltage and thus, whenever the source voltage is fluctuated for some reason or other, the voltage applied between the base and emitter of the switching transistor is also fluctuated even if the induced voltage is constant, and this has not only failed to obtain accurate comparison but also varied the base-emitter voltage $V_{BE}$ of the transistor itself with respect to the temperature variation, thus failing to provide an accurate speed control.

SUMMARY OF THE INVENTION

It is a first object of the present invention to provide a Hall motor control system which eliminates the above-noted disadvantages existing in the conventional Hall motor control system.

It is a second object of the present invention to provide a Hall motor control system in which the speed variation created due to the temperature characteristic of the diode when detecting the induced voltages produced in driving coils or voltage detecting coils by rotation of the motor may be temperature-compensated by a diode compensating circuit provided in two input circuits for the comparing circuit, thus stabilizing the motor operation.

It is a third object of the present invention to provide a Hall motor control system in which comparison between the speed signal corresponding to the rotational speed of the motor and the reference signal is effected by a stable differential amplifier and in which a predetermined speed of very stable rotation may be provided by the use of the signal input circuit as well as a compensating circuit for temperature and source voltage variations and a ripple smoothing integration circuit.

Other objects of the present invention will become apparent from the following detailed description and the accompanying drawings.

DESCRIPTION OF THE PREFERRED EMBODIMENTS

The conventional Hall motor control system and the inventive Hall motor control system will hereinafter be described in detail with respect to some embodiments thereof and by reference to the drawings.

Figure 1:
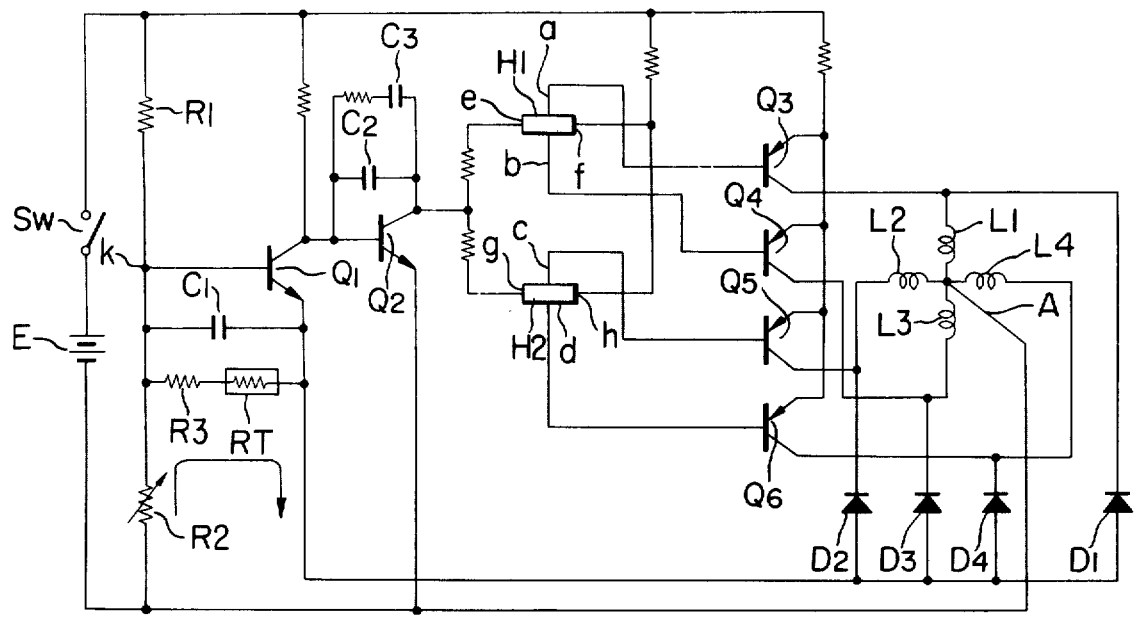
FIG. 1 is a circuit diagram showing an embodiment of the Hall motor control system according to the prior art.

FIG. 1 is a circuit diagram showing an embodiment of the conventional Hall motor control system, in which $L_1$ to $L_4$ designate motor driving coil and $H_1$ and $H_2$ denote Hall elements. These are disposed on a stator S and form a Hall motor with a rotor R shown in FIG. 2. Designated by $Q_3$ to $Q_6$ are transistors of the motor driving circuit having their emitters connected to a power source E and their collectors connected to the aforesaid driving coils. The bases of the transistors $Q_3$–$Q_6$ are connected to the output terminals $a$, $b$, $c$ and $d$ of the Hall elements $H_1$ and $H_2$ and may be driven by the voltages produced at these output terminals of the Hall elements. $D_1$ to $D_2$ are diodes connected to the respective driving coils $L_1$ to $L_4$ to detect and synthesize the induced voltages produced in the driving coils $L_1$-$L_4$ as the result of the rotation of the rotor R. A resistor $R_1$ and a variable resistor $R_2$ together constitute a voltage dividing circuit for the power source E. $Q_1$ $Q_2$ designate switching transistors. The transistor $Q_1$ has the base thereof connected to the connection point $k$ in the voltage dividing circuit and the collector thereof connected to the diodes $D_1$-$D_4$. $R_3$ is a resistor connected between the base and emitter of the transistor $Q_1$, and RT a temperature compensating thermistor series-connected to the resistor $R_3$. The transistor $Q_2$ has the base thereof connected to the collector of the transistor $Q_1$ and the emitter thereof connected to the negative (−) pole of the power source. The collected of the transistor $Q_2$ is connected to the junction between one input terminal $e$ of the Hall element $H_1$ and one input terminal $g$ of the Hall element $H_2$. The other input terminals $F$ and $h$ of the Hall elements $H_1$ and $H_2$ are connected to the positive (+) pole of the power source E through a resistor. $C_1$, $C_2$ annd $C_3$ designate capacitors for smoothing the switching operation of the switching transistors $Q_1$ and $Q_2$, and SW is a main switch.

Figure 2A:
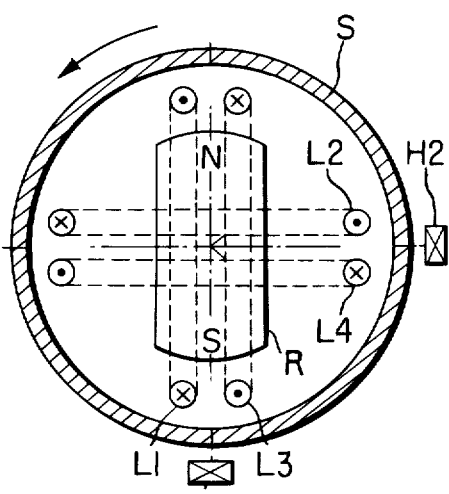
FIG. 2 schematically illustrates the conventional Hall motor, FIG. 2(a) being an illustration of the arrangement of the motor's rotor, driving coils and Hall elements, and FIG. 2(b) showing a composite waveform of the voltages induced in the driving coils $L_1$, $L_2$, $L_3$ annd $L_4$ shown in FIG. 2(a).

FIG. 2(a) is a cross-sectional view showing the construction of the Hall motor shown in FIG. 1. In this figure, $L_1$-$L_4$ and $H_1$, $H_2$ correspond to the driving coils and Hall elements shown in FIG. 1, and R is the rotor comprising a permanent magnet.

Figure 2B:
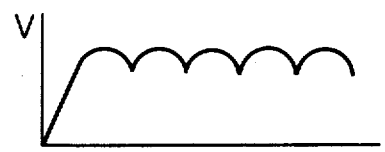

When the main switch SW is closed with the rotor R, the Hall elements $H_1$, $H_2$ and the driving coils $L_1$-$L_4$ being in their respective positions shown in FIG. 2, a divisional voltage derived from the voltage of the power source E is applied to the base of the transistor $Q_1$ through the voltage dividing circuit provided by the resistor $R_1$ and the variable resistor $R_2$, but since the resistance value of $R_2$ is preset to a very small one as compared with that of $R_1$, the transistor $Q_1$ becomes non-conductive and thus, the transistor $Q_2$ becomes conductive. As the result, a current flows to the Hall elements $H_1$ and $H_2$ through the respective routes $f$—$e$-$Q_2$ and $h$-$g$-$Q_2$. Assuming that the rotor R and the Hall elements $H_1$, $H_2$ are in their positions shown in FIG. 2, the magnetic flux of the rotor causes a negative (−) and a positive (+) voltage to be produced at the output terminals $a$ and $b$ of the Hall element $H_1$, respectively, so that the base potential of the transistor $Q_3$ becomes lower than the emitter potential thereof and thus, the transistor $Q_3$ becomes conductive. This permits a driving current to flow to the driving coil $L_1$ and start to rotate the rotor R in the direction of arrow. When the rotor R has rotated through 90° with the S pole thereof coming to the position facing the Hall element $H_2$, a negative (−) and a positive (+) voltage are produced at the output terminals $c$ and $d$ of the Hall element, so that the transistor $Q_5$ is rendered conductive to permit the driving current to flow to the driving coil $L_2$ and further rotate the rotor R in the direction of arrow. When the N pole of the rotor R comes round to the position facing the Hall element $H_1$, the driving current flows to the driving coil $L_3$, and when the N pole of the rotor R comes round to the position facing the Hall element $H_2$, the driving current flows to the driving coil $L_4$, whereby the rotor R continues to rotate in the direction of arrow. As the rotor R so rotates, induced voltages corresponding to the magnetic flux and the rotational speed of the rotor R are produced in those of the driving coils through which no current is then flowing, and these induced voltages are synthesized by the diodes $D_1$-$D_4$ to produce at a point A a negative voltage with a magnitude as shown in FIG. 2(b). As the result, a current corresponding to the voltage at the point A flows to the resistor $R_3$ through $R_2$-$R_3$-RT-$D_1$-$D_2$-$D_3$-$D_4$, thus causing a voltage drop to result from the resistors $R_3$ and RT. Such voltage drop resulting from the resistors $R_3$ and RT is the divisional voltage derived from the voltage at the point A, thus assuming a value corresponding to the rotational speed of the rotor R. Assuming that the rotor R is rotating at a higher speed than a predetermined reference rotational speed, the voltage drop resulting from the resistors $R_3$ and RT becomes greater and exceeds the base-emitter voltage $V_{BE}$ of the transistor $Q_1$, so that the transistor $Q_1$ becomes conductive to thereby render the transistor $Q_2$ non-conductive. By the conduction of the transistor $Q_2$, the power supply circuit to the Hall elements $H_1$ $H_2$ is cut off and no Hall voltage is produced, so that no driving current flows to the driving coils $L_1$-$L_4$ and the rotational speed of the rotor R is slowed down and controlled to the predetermined speed. In the conventional control circuit, as noted above, the comparison of the current rotational speed of the motor with the reference rotational speed is effected with the base-emitter voltage $V_{BE}$ of the transistor $Q_1$ as the reference voltage and this not only requires the comparing transistor to be of high accuracy but also the transistor is liable to be affected by the temperature and the source voltage.

Figure 3:
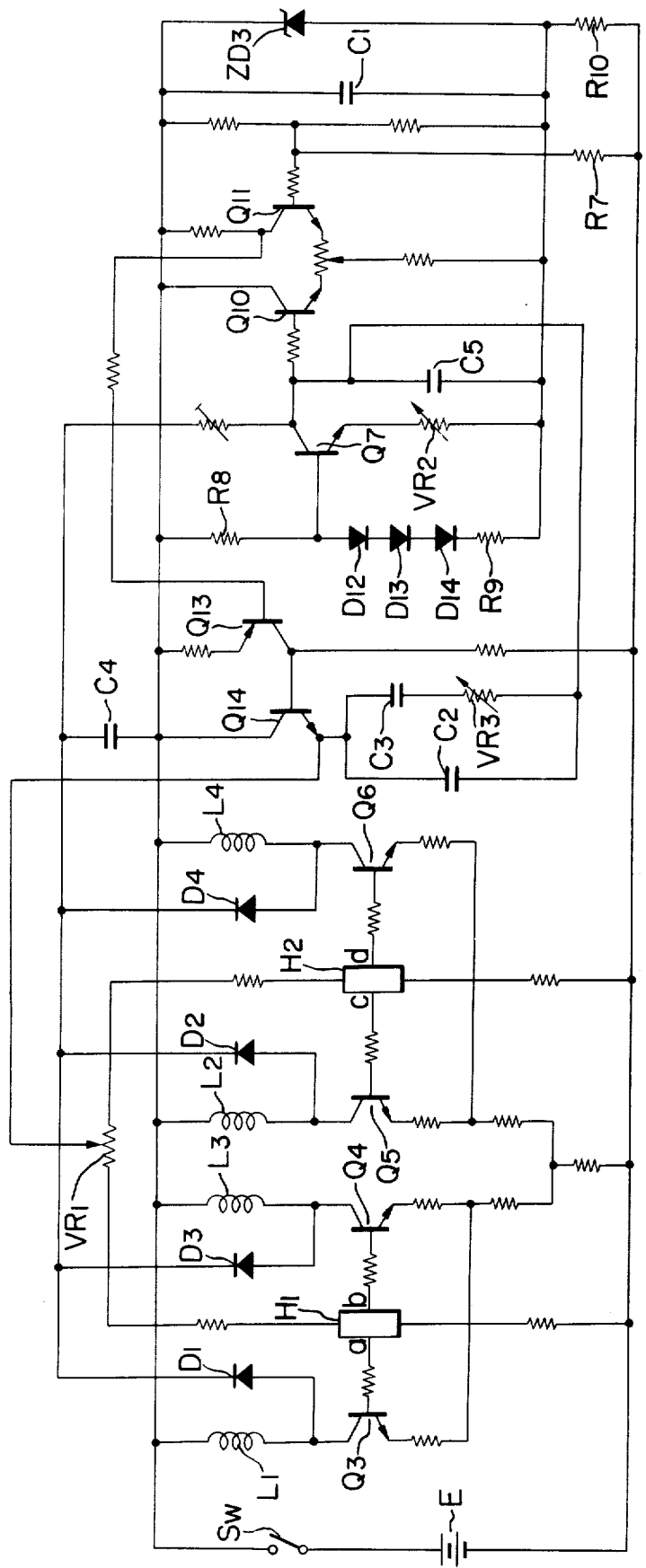
FIG. 3 is a circuit diagram showing first embodiment of the Hall motor control system according to the present invention.

FIG. 3 is a circuit diagram showing a first embodiment of the control system for the Hall motor according to the present invention. The circuit includes driving coils $L_1$-$L_4$, driving transistors $Q_3$-$Q_6$, Hall elements $H_1$, $H_2$, diodes $D_1$-$D_4$ for detecting and synthesizing the induced voltages produced in the coils $L_1$-$L_4$, resistors and diode $R_8$, $R_9$ and $D_{12}$ together forming a constant current circuit, level shift transistor $Q_7$, differential amplifiers $Q_{10}$, $Q_{11}$, constant voltage Zener diode $ZD_3$ for providing a reference speed voltage, resistance element $R_7$ for compensating for the variation in the reference speed voltage by the variation in the source voltage, capacitors $C_2$-$C_5$ and variable resistor $VR_3$ together forming an integration circuit and serving to smooth the Hall input voltage. The circuit further includes Hall input control transistors $Q_{13}$, $Q_{14}$, diodes $D_{13}$, $D_{14}$ installed within the motor or at locations suited for the detection of the heating of the motor to compensate for temperature variation of the motor, and variable resistor $VR_2$ for varying the number of revolutions of the motor.

Operation of the circuit shown in FIG. 3 will now be discussed. When the main switch SW is closed, a predetermined voltage is applied across the Zener diode $ZD_3$ and a predetermined voltage is applied to the bases of the transistors $Q_7$ and $Q_{11}$. Thus, a predetermined current flows through the transistor $Q_7$ so that the voltage drop in the variable resistor $VR_2$ is always constant independently of the induced voltage. Since the sum of the source voltage and the induced voltage corresponding to the rotational speed of the motor is being produced at the common terminal of the diodes $D_1$-$D_4$, the base potential of the transistor $Q_{10}$ is at a value equal to the sum of the source voltage and the induced voltage which has been level-shifted and thus, it is restricted within the operating voltage of the differential amplifier circuit and assumes a value exactly corresponding to the value of the induced voltage. This method ensures application of a voltage corresponding to some DC level and therefore, even if the rotation output voltage is decreased, a sufficient input voltage may be imparted to the differential circuit and this greatly facilitates the low speed rotation control. Now, when the induced voltage is greater than its predetermined value, namely, when the motor is rotating at a higher speed than the reference speed, the base voltage of the transistor $Q_{10}$ exceeds the base voltage of the transistor $Q_{11}$ and thus, the base voltage of the transistor $Q_{13}$ is increased to thereby decrease the current flowing to the Hall elements and slow down the rotational speed of the motor, so that the rotational speed of the motor is controlled to be always constant. During the above-described sequence of control, the collector voltage of the transistor $Q_{11}$ contains an AC component resulting from ripples of the induced voltage, but such ripple component is detected by the integration circuit comprising the capacitors $C_2$, $C_3$ and variable resistor $VR_3$ and is removed by the voltage put out at the output terminal of the transistor $Q_{14}$, so that a smoothed voltage is applied to the Hall elements to thereby stabilize the circuit operation.

Diodes $D_{13}$ and $D_{14}$ are temperature compensating diodes for preventing occurrence of such a phenomenon that when the magnetic flux of the rotor is varied by the temperature to vary its induced voltage, an input voltage exactly corresponding to the rotational speed is not applied to the differential amplifier circuit. Although a Zener diode is provided in the constant voltage circuit which obtains the reference speed voltage, even this cannot ensure the production of completely constant voltage if the source voltage fluctuates. For this reason, a resistor $R_7$ is connected between the input terminal of the differential amplifier and the negative pole of the power source so that the voltage fluctuation may be applied in the opposite phase so as to negate any fluctuation of the reference speed voltage.

In the Hall motor control system according to the present invention, as has been described above, the comparison of the speed signal with the reference signal is effected by a stable differential amplifier and the input and output circuits for the comparison signal are provided with a compensating circuit for temperature and source voltage variations and a ripple smoothing integration circuit, and the arrangement of these circuits ensures very stable rotation of the motor at a constant speed.

Figure 4:
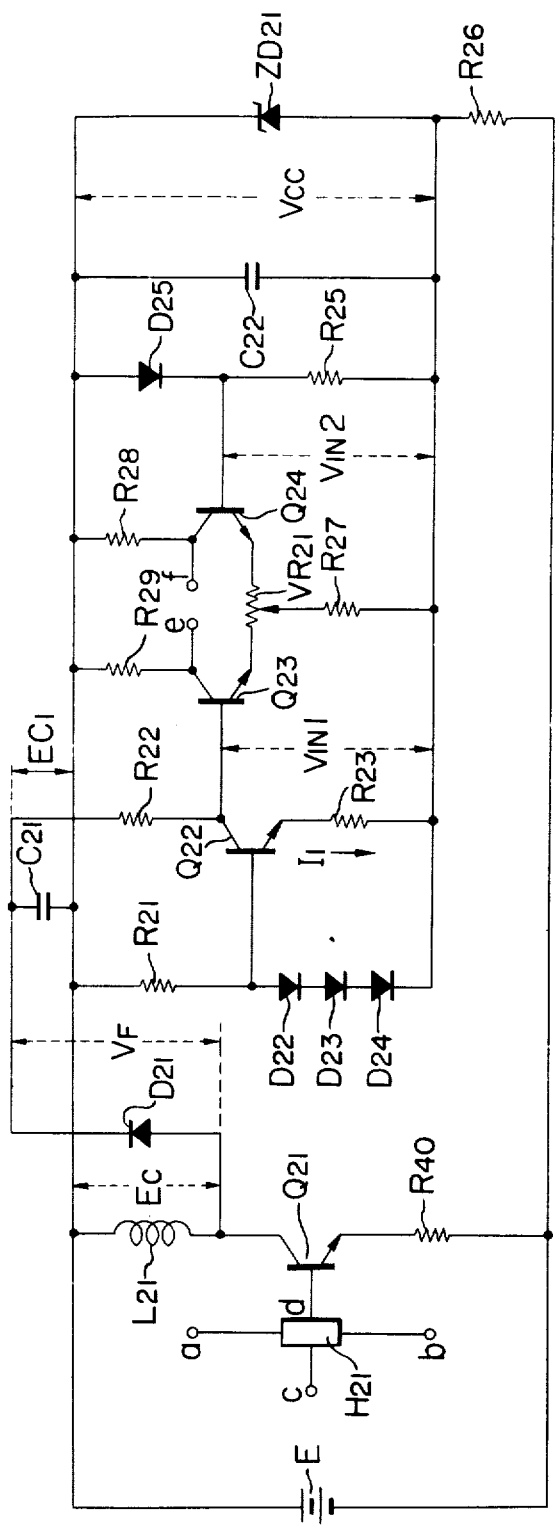
FIG. 4 is a circuit diagram showing essential portions of a second embodiment of the Hall motor control system according to the present invention.

FIG. 4 diagrammatically shows the essential electrical connections in a second embodiment of the Hall motor control system according to the present invention. This circuit diagram includes a power source E, a Hall element $H_{21}$, a driving transistor $Q_{21}$, a driving coil $L_{21}$, and input terminals $a$, $b$ and output terminals $c$, $d$ of the Hall element $H_{21}$. It further includes a diode $D_{21}$ for detecting the voltage induced in the coil $L_{21}$, a transistor $Q_{22}$ forming a level shift circuit, a voltage dividing resistor $R_{21}$ for obtaining the base voltage of the transistor $Q_{22}$, collector and emitter resistors $R_{22}$ and $R_{23}$, and temperature compensating diodes $D_{22}$, $D_{23}$, $D_{24}$. There are further provided transistors $Q_{23}$ and $Q_{24}$ together forming a differential amplifier having output terminals $e$ and $f$, temperature compensating diode $D_{25}$ for the reference voltage circuit, resistor $R_{25}$ for the same circuit, collector resistor $R_{28}$ of the transistor $Q_{23}$, emitter resistor $R_{30}$ of the transistor $Q_{25}$, capacitor $C_{22}$ and Zener diode $ZD_{21}$. By these, the reference speed voltage is applied as input to the base of the transistor $Q_{24}$ of the differential amplifier. Designated by $VR_{21}$ is a balancing variable resistor for the differential amplifier, and $R_{27}$ a common emitter resistor. In the circuit shown, let $E_C$ be the voltage induced in the driving coil $L_{21}$, and $E_C$ may be expressed as $E_C = KW$, where $W$ is an angular speed which may be expressed as $W = 2\pi f$. When the induced voltage $E_C$ is taken out through the diode $D_{21}$, there is obtained in the output thereof a voltage $E_{C1} = E_C - V_F$, where $V_F$ is the forward voltage drop in the diode.

When the motor is rotating at high speed, $E_C$ is much higher than $V_F$ and thus, $V_F$ may be neglected on the assumption that $E_{C1} = E_C$, but during low speed rotation of the motor, $E_C$ is at so low a value that $E_C$ and $V_F$ become voltages of the same order, and variation in $V_F$ results in a great variation in the output voltage $E_{C1}$ of the diode. More specifically, if temperature variation of the diode due to its temperature characteristic causes $V_F$ to vary such as $$\frac{aV_F}{aT},$$

this will greatly affect the set number of revolutions to an inconvenience. In the driving circuit of the present invention, such temperature variation may be compensated for by diodes at two input voltages of the comparing differential amplifier. If, as shown, the output voltage of the level shift circuit is $Vin_1$ and the current is $I_1$, then $$Vin_1 = V_{CC} + E_C - V_{P1} - I_1 R_2 \tag{1}$$

Also, the voltage drop in the emitter resistor $R_{23}$ of the level shift transistor $Q_{22}$ will be:

$$I_1 R_{23} = V_{D22} + V_{D23} + V_{D24} - V_{BE22}$$

If $V_{D22}$ is selected to $V_{D22} = V_{D23} = V_{D24} = V_{BE22}$, $I_1 R_{23}$ will be expressed as $I_1 R_{23} = 2V_{D22}$, where $I_1$ is the current flowing through the constant current circuit and it assumes a predetermined value when temperature variation is not taken into account. By substituting $I_1$ for equation (1), there is obtained:

$$Vin_2 = V_{CC} + E_C - V_{D21} - 2\frac{R_{22}}{R_{23}} V_{D22} \tag{2}$$

Also, if the other input voltage of the differential circuit, namely, the reference speed voltage, is expressed as $Vin_2$, $$Vin_2 = V_{CC} - V_{D5} \tag{3}$$

Assuming that the diodes $D_{21}$ and $D_{25}$ used are of the identical characteristic, $V_{D21} = V_{D25}$ and hence, equation (3) may be rewritten as:

$$E_C - 2\frac{R_{22}}{R_{23}} V_{D22} = 0$$

Thus, the following relation is obtained:

$$E_C = 2\frac{R_{22}}{R_{23}} V_{D22} \tag{4}$$

Equation (4) may be represented by using the constant current $I_1$, as follows:

$$E_C = R_{22} I_1 \tag{5}$$

From equation (5), it follows that a voltage equal to the reverse induced voltage $E_C$ is produced across the resistor $R_{22}$.

In order that the comparing differential amplifier may be balanced, equation (4) only need be satisfied and this means that when $V_{D22}$ is constant, $$\frac{R_{22}}{R_{23}}$$

only need be selected with respect to the induced voltage $E_C$ so as to satisfy equation (4). Also, by varying the resistance value of either $R_{22}$ or $R_{23}$, it is possible to vary the induced voltage $E_C$, i.e., the number of revolutions of the motor.

Next, when $E_C$ is affected by temperature, equation (4) will change to:

$$\frac{aE_C}{aT} = 2 \frac{R_{22}}{R_{23}} \frac{aV_{C22}}{aT} \qquad (6)$$

In this case, temperature compensation may be accomplished by selecting $R_{22}/R_{23}$ so as to satisfy equation (6). This is a ratio of resistance value and can be accomplished with relative ease. $R_{22}/R_{23}$ in equation (6) can be selected independently of temperature and thus, temperature compensation may be provided even if the vlaue of such ratio is varied to change the number of revolutions. For example, if the number of revolutions is changed with $R_{23'} = 4R_{23}$, equation (6) will be:

$$\frac{1}{4}\left(\frac{aE_C}{aT}\right) = \frac{1}{4} \frac{R_{22}}{R_{23}} \cdot 2\left(\frac{aV_{D22}}{aT}\right)$$

Thus, in this case, the number of revolutions will be ¼ and temperature compensation will occur.

Figure 5:
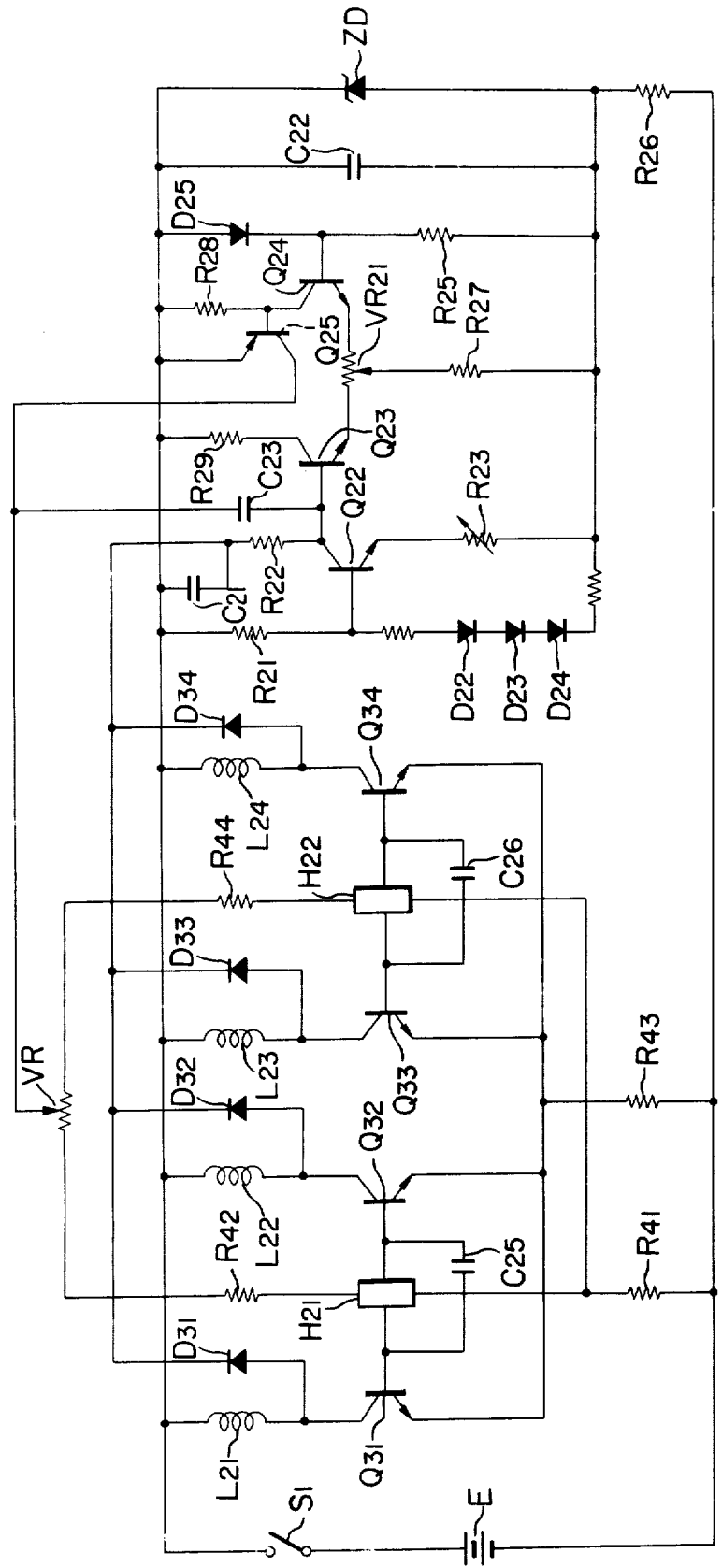
FIG. 5 is a circuit diagram showing another embodiment of the FIG. 4 control system as applied to a four-phase Hall motor.

FIG. 5 is a circuit diagram showing an embodiment of the driving circuit according to the present invention as applied to a four-phase Hall motor. In FIG. 5, the parts identical with those in FIG. 4 are given identical reference characters. $L_{21}$–$L_{24}$ are the driving coils of the motor and driving transistors $Q_{31}$–$Q_{34}$ may be changed over for conduction by Hall elements $H_{21}$ and $H_{22}$ to permit flow of driving current to rotate a rotor comprising a permanent magnet, not shown. $R_{41}$ and $R_{42}$ are input adjusting resistors for the Hall element $H_{21}$, and $R_{41}$ and $R_{44}$ are similar resistors for the Hall element $H_{22}$. $D_{31}$–$D_{34}$ are diodes for detecting and synthesizing the voltages induced in the hollow coils by rotation of the motor, and $C_{25}$ and $C_{26}$ are capacitors for preventing the mix of noise. VR is a variable resistor for regulating the balance of Hall element inputs. A voltage proportional to the rotational speed detected by the diodes $D_{31}$–$D_{34}$ is applied to the collector of the transistor $Q_{23}$ of the comparing differential amplifier through the integration circuit comprising capacitors $C_2$ annd $R_{22}$. Also applied to the base of the transistor $Q_{23}$ is the voltage from a level shift circuit comprising a transistor $Q_{22}$, resistors $R_{21}$, $R_{22}$, $R_{23}$ and diodes $D_{22}$–$D_{24}$. The reference speed voltage from a reference voltage circuit comprising a Zener diode ZD, capacitor $C_{22}$, temperature compensating diode $D_{25}$ and resistor $R_{25}$ is applied to the input of the transistor $Q_{24}$ of the differential amplifier for comparison with the input to the transistor $Q_{23}$. $D_{22}$–$D_{24}$ are temperature-compensating diodes and $R_{23}$ is a variable resistor for varying the speed. The output of the differential amplifier is fed back to the Hall element input circuit through a buffer transistor $Q_{25}$ to control the Hall element inputs and accordingly the rotational speed of the motor, thus providing motor rotation at a predetermined speed. The temperature compensating and speed changing operations of this circuit are the same as described in connection with FIG. 4 and need not be described.

Figure 6:
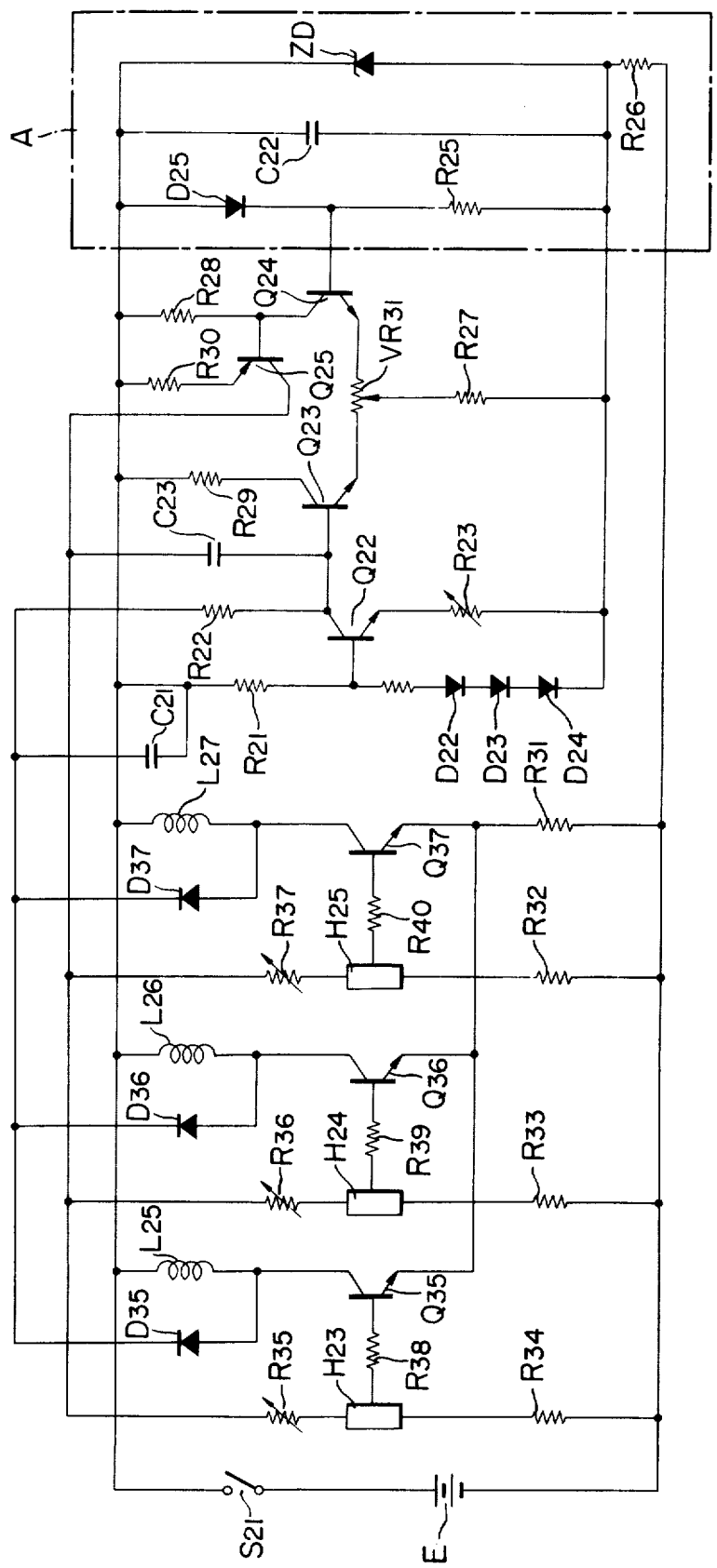
FIG. 6 is a circuit diagram showing still another embodiment of the FIG. 4 control system as applied to a three-phase Hall motor.

FIG. 6 is a circuit diagram showing another embodiment of the present invention as applied to a three-phase motor. The shown embodiment differs from the FIG. 5 embodiment only in the construction of the driving circuit and identical parts are given identical reference characters. $L_{25}$–$L_{27}$ are driving coils for three-phases, $H_{23}$–$H_{25}$ are Hall elemments, $R_{35}$–$R_{37}$ are variable resistors for balancing the respective Hall elements at their input sides, and $Q_{35}$–$Q_{37}$ are driving transistors. $R_{34}$, $R_{35}$ are input adjusting resistors for the Hall elements $H_{23}$; $R_{33}$, $R_{36}$ are similar resistors for the Hall element $H_{24}$; and $R_{32}$, $R_{37}$ are similar resistors for the Hall element $H_{25}$. Operation of this circuit is substantially identical with the case of the four-phase motor shown in FIG. 5. The outputs of the comparison and control transistors $Q_{23}$ and $Q_{24}$ may be amplified by $Q_5$ to control the inputs to the Hall elements $H_{23}$–$H_{25}$, whereafter a predetermined speed of rotation may be provided by the motor control circuit.

Figure 7:
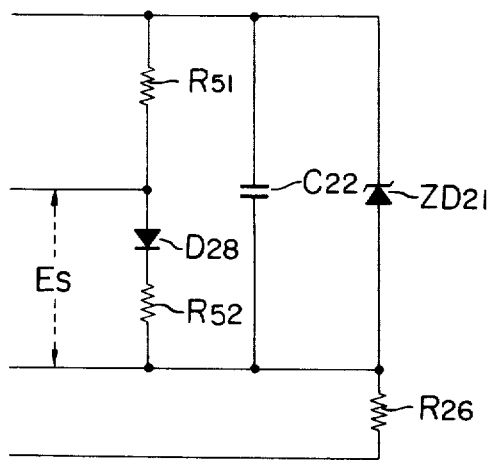
FIG. 7 is a circuit diagram showing a modification of a portion of a circuit diagram of FIG. 6.

FIG. 7 diagrammatically shows a modification of only the portion A of the circuit according to the second embodiment shown in FIG. 6. There are seen resistors $R_{51}$ and $R_{42}$ forming the reference voltage circuit, temperature compensating diode $D_{28}$ for the reference voltage circuit, capacitor $C_{22}$ and Zener diode $ZD_{21}$. By these, the reference speed voltage may be applied as input to the base of the transistor $Q_{24}$ of the differential amplifier shown in FIG. 6. The present embodiment utilizes variation in forward voltage drop $V_F$ resulting from the temperature of the diode $D_{28}$, to impart to the reference signal $E_S$ the temperature variation component of the induced voltage from the motor and thereby negate the voltage variation resulting from the temperature of the transistor $Q_{24}$ of the differential amplifier.

Figure 8:
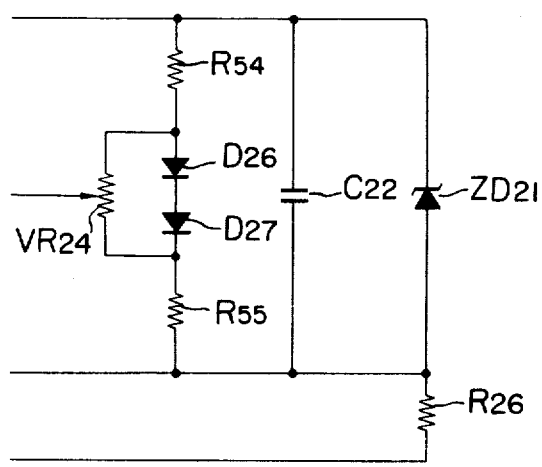
FIG. 8 is a circuit diagram showing a further modification of a portion of a circuit diagram of FIG. 6.

FIG. 8 diagrammatically shows a further modification of only the portion A of the circuit according to the second embodiment shown in FIG. 6. There are seen resistors $R_{54}$ and $R_{55}$ forming the reference voltage circuit, temperature compensating diodes $D_{26}$ and $D_{27}$ for the reference voltage circuit, capacitor $C_{22}$, Zener diode $ZD_{21}$, and potentiometer $VR_{24}$ for suitably dividing the voltages of th diodes $D_1$ and $D_2$. By these, the reference voltage divided by the potentiometer $VR_{24}$ may be applied as input to the base of the transistor $Q_{24}$ of the differential amplifier shown in FIG. 6. In view of the fact that the voltages of the diodes $D_1$ and $D_2$ can be increased or decreased only in a stepwise manner, the present embodiment employs the potentiometer $VR_{24}$ to divide the voltage so as to continuously provide any desired temperature compensating voltage for the transistor $Q_{24}$.

In the Hall motor driving circuit according to the present invention, as will be aapreciated, the speed variation resulting from the temperature characteristic during the detection of the induced voltage by the diode is temperature-compensated by the diode compensating circuit provided in the two input circuits of the comparing circuit and such compensating operation may occur independently of the set speed. This leads not only to stabilized operation of the motor but also to variability of the resistance of the level shift circuit and accordingly any desired variability of the set speed, thus being highly effective.

What is claimed is:

1. A DC motor having a control system therefor comprising, in combination:
   a. a rotor having thereon magnetic poles of the opposite polarities;
   b. a stator having flux-producing windings positioned in torque-producing relationship with said rotor, each of said windings producing an induced voltage upon rotation of said rotor;
   c. detecting means for detecting and synthesizing the induced voltages in said windings;
   d. voltage level shift means for level-shifting the output voltage of said detecting means, said level shift means having a transistor circuit connected to said detecting means;
   e. constant voltage means connected to one electrode of a power source for producing always a constant potential with respect to the potential of said electrode;
   f. reference rotational speed information input means connected across said constant voltage means for producing a constant voltage corresponding to the reference rotational speed of said motor;
   g. comparing means comprising a differential amplifier circuit having two input terminals, one of said input terminals being connected to said voltage level shift means and the other input terminal being connected to said reference rotational speed information input means so as to provide a signal representing the difference between said two inputs;
   h. Hall generators positioned in flux-producing relationship with said magnetic poles for producing a Hall voltage corresponding to the output voltage of said comparing means;
   i. driving control means connected to the output of said Hall generators and said stator windings to apply an exciting current to said windings in response to the output voltage of said Hall generators; and
   j. temperature compensating means including at least one diode connected to the input circuit of said transistor of said voltage level shift means.

2. A DC motor according to claim 1, wherein said voltage level shift means has a speed varying resistor connected to the emitter circuit of said transistor.

3. A DC motor according to claim 1, wherein said temperature compensating means has at least one diode in said reference rotational speed information input means.

4. A DC motor according to claim 1, wherein said differential amplifier circuit has high impedance means, of which one end is connected to the junction between the input terminal of said differential ammplifier circuit and said reference rotational speed information input means and the other end is connected to the electrode opposite from the electrode connected to said windings.

5. A DC motor having a control system therefor comprising, in combination:
   a. a rotor having thereon magnetic poles of the opposite polarities;
   b. a stator having flux-producing windings positioned in torque-producing relationship with said rotor, each of said windings having one end connected to one electrode of a power source, the other ends of said windings producing induced voltages corresponding to the rotational speed of said rotor;
   c. detecting means connected to the other ends of said windings to detect and synthesize said induced voltages;
   d. a differential amplifier circuit having at least two input transistors;
   e. voltage level shift means for level-shifting the output voltage of said detecting means, said level shift means having a transistor circuit having the input terminal thereof connected to said detecting means and the output terminal connected to the input terminal of one of said input transistors of said differential amplifier circuit;
   f. constant voltage means connected to one electrode of said power source for producing always a constant potential with respect to the potential of said electrode;
   g. reference rotational speed information input means for putting out a constant voltage corresponding to the reference rotational speed of said motor, said reference information input means being connected across said constant voltage means and having the output terminal thereof connected to the input terminal of the other input transistor of said differential amplifier circuit;
   h. Hall generators positioned in flux-producing relationship with said magnetic poles for producing a Hall voltage corresponding to the output voltage of said differential amplifier 00;
   i. driving control means connected to the output of said Hall generators and said stator windings to apply an exciting current to said windings in response to the output voltage of said Hall generators; and
   j. temperature compensating means including:
      first temperature compensating means having at least one diode connected to the input circuit of said transistor of said voltage level shift means to compensate for the temperature of said transistor; and
      second temperature compensating means having at least one diode disposed in said reference rotational speed information input means to compensate for the temperature of said transistor connected to the output terminal of said reference rotational speed information input means of said differential amplifier circuit.

6. A DC motor according to claim 5, wherein said voltage level shift means includes a speed varying variable resistor connected to the emitter circuit of said transistor.

7. A DC motor according to claim 5, wherein said reference rotational speed information input means has said output terminal thereof connected to the junction between impedance means and said second temperature compensating means which are series-connected together.

8. A DC motor according to claim 5, wherein said reference rotational speed information input means includes impedance means series-connected to the opposite ends thereof between which said second temperature compensating means is interposed, and a potentiometer parallel-connected to said second temperature compensating means, and wherein the input circuit of said transistor connected to said reference rotational speed information input means of said differential amplifier circuit is connected to said potentiometer.

9. A DC motor having a control system therefor comprising, in combination:
   a. a rotor having thereon magnetic poles of the opposite polarities;
   b. a stator having flux-producing windings positioned in torque-producing relationship with said rotor, each of said windings producing an induced voltage upon rotation of said rotor;
   c. detecting means for detecting and synthesizing the induced voltages in said windings;
   d. a differential amplifier circuit including at least two input transistors;
   e. voltage level shift means for level-shifting the output voltage of said detecting means, said level shift means having a transistor circuit having the input terminal thereof connected to said detecting means and the output terminal connected to the input terminal of one of said input transistors of said differential amplifier circuit;
   f. constant voltage means connected to one electrode of said power source for producing always a constant potential with respect to the potential of said electrode;
   g. reference rotational speed information input means for producing a constant voltage corresponding to the reference rotational speed of said motor, said reference information input means being connected across said constant voltage means and having the output terminal thereof connected to the input terminal of the other input transistor of said differential amplifier circuit;
   h. Hall generators positioned in flux-producing relationship with said magnetic poles for producing a Hall voltage corresponding to the output voltage of said comparing means;
   i. driving control means connected to the output of said Hall generators and said stator windings to apply an exciting current to said windings in response to the output voltage of said Hall generators; and
   j. temperature compensating means including:
   first temperature compensating means having at least one diode connected to the input circuit to said transistor of said voltage level shift means to compensate for the temperature of said transistor; and
   second temperature compensating means having at least one diode disposed in said reference rotational speed information input means to compensate for the temperature of said transistor connected to the output terminal of said reference amplifier circuit;
   k. high impedance means for compensating for source voltage variation of said reference rotational speed information input means, one end of said impedance means being connected to the junction between the input terminal of said input transistor connected to the output terminal of said reference rotational speed information input means of said differential amplifier circuit and said reference rotational speed information input means, the other end of said impedance means being connected to the electrode opposite from said electrode connected to said windings.

10. A DC motor according to claim 9, wherein said voltage level shift means includes a speed varying variable resistor connected to the emitter circuit of said transistor.

11. A DC motor according to claim 9, wherein said reference rotational speed information input means has said output terminal thereof connected to the junction between impedance means and said second temperature compensating means which are series-connected together.

12. A DC motor according to claim 9, wherein said reference rotational speed information input means includes impedance means series-connected to the opposite end thereof between which said second temperature compensating means is interposed, and a potentiometer parallel-connected to said second temperature compensating means, and wherein the input circuit of said transistor connected to said reference rotational speed information input means of said differential amplifier circuit is connected to said potentiometer.

* * * * *